United States Patent
Gaynor et al.

(10) Patent No.: US 6,660,245 B1
(45) Date of Patent: Dec. 9, 2003

(54) METHODS FOR DETEMPLATING ZEOLITES AND SILICALITES FOR USE IN INTEGRATED CIRCUIT MANUFACTURE

(75) Inventors: Justin F. Gaynor, San Jose, CA (US); Patrick Vancleemput, Sunnyvale, CA (US)

(73) Assignee: Novellus Systems, Inc., San Jose, CA (US)

( * ) Notice: Subject to any disclaimer, the term of this patent is extended or adjusted under 35 U.S.C. 154(b) by 103 days.

(21) Appl. No.: 10/046,009

(22) Filed: Jan. 11, 2002

Related U.S. Application Data

(63) Continuation-in-part of application No. 09/782,985, filed on Feb. 13, 2001, now Pat. No. 6,533,855.

(51) Int. Cl.[7] .......................... C01B 37/02; C01B 39/40
(52) U.S. Cl. .............................. 423/705; 423/DIG. 22; 423/335; 502/4; 502/85; 502/86; 427/444
(58) Field of Search ................................ 423/702, 705, 423/706, 707, 708, 713, 714, 715, DIG. 22; 502/85, 86, 4; 427/344, 377, 397.7, 444

(56) References Cited

U.S. PATENT DOCUMENTS

| | | | | |
|---|---|---|---|---|
| 3,766,093 A | * | 10/1973 | Chu ............................ | 502/61 |
| 4,335,020 A | * | 6/1982 | Chu et al. .................... | 502/77 |
| 5,066,630 A | * | 11/1991 | Kitamura et al. ............. | 502/85 |
| 5,143,879 A | * | 9/1992 | Whitehurst .................. | 502/85 |
| 5,681,789 A | * | 10/1997 | Saxton et al. ................. | 502/85 |

* cited by examiner

*Primary Examiner*—David Sample
(74) *Attorney, Agent, or Firm*—Roland Tso

(57) ABSTRACT

Structure-directing agents, such as quaternary ammonium, are removed from silicalite or zeolite crystals by oxidative attack (e.g., using $CO_2$, $H_2O$ or $NH_3$) first, by using a combination of ammonia, water and hydrogen peroxide at an elevated temperature; second, by using choline, hydrogen peroxide and a surfactant; third, by using ozonated water; and fourth, by exposing the crystals to an oxygen-containing plasma. Thin porous films of silicalite or zeolite crystals are useful, for example, in forming low dielectric constant insulating layers in semiconductor chip fabrication. In order for the silicalite or zeolite crystals to form a low dielectric constant film, however, the entrained molecules of the structure-directing agent must be removed.

25 Claims, 3 Drawing Sheets

METHODS FOR DETEMPLATING ZEOLITES AND SILICALITES FOR USE IN INTEGRATED CIRCUIT MANUFACTURE

This application is a continuation-in-part of U.S. application Ser. No. 09/782,985, filed Feb. 13, 2001, now U.S. Pat. No. 6,533,855 which is incorporated herein by reference in its entirety.

BACKGROUND

1. Technical Field

The present invention relates to colloidal silicalite and zeolite crystals and, more particularly, to methods of removing entrained organic template molecules from within the crystals, and to applications of the detemplated crystals to produce thin films or membranes of zeolites or silicalites on substrates. The thin films may be used as separation membranes, catalytic membranes or low dielectric constant insulators in microelectronic devices.

2. Description of Related Art

One recent innovation in the formation of porous membranes has been the development of colloidal zeolites and silicalites. Sub-micron sized particles suspended in a liquid matrix are easily converted to a thin film on a substrate by a variety of methods. While membranes formed in this manner may ultimately be very useful in chemical catalysis and purification, the descriptions and examples in this application will emphasize films used in integrated circuit manufacture.

Increasing the speed and performance of integrated circuits ("ICs") typically calls for increasing the density of electronic components on the surface of a semiconductor wafer and increasing the speed at which the IC performs its functions. Increasing component density brings the charge-carrying circuit elements closer together, thereby increasing the capacitive coupling (crosstalk) between such circuit elements and delay in the propagation of signals through the conductors. Higher capacitance is detrimental to circuit performance, especially for high-frequency operation, as is typically encountered in telecommunication applications and elsewhere. One way of reducing the capacitive coupling between proximate circuit elements is to reduce the dielectric constant ("k") of the insulator or insulating material(s) separating the coupled circuit elements.

It has been conventional in the fabrication of ICs to use dense materials as dielectrics, including silicon dioxide, silicon nitride and cured silsesquioxanes among others. The dielectric constant (k) of these materials typically lies in the range of approximately 3.0 to 7.0.

It is anticipated that the performance of future ICs is likely to be limited by resistive-capacitive ("RC") delay occurring in the metallic interconnects of the IC, indicating that lower k dielectrics will be required for future ICs. As yet, the only fully dense materials with k less than about 2.4 are fluorinated polymers or fully aliphatic hydrocarbon polymers. However, such materials have not been shown to have sufficient thermal and mechanical stability to survive the thermal and mechanical stresses occurring during IC fabrication. In addition, these polymers typically have chemical properties that are similar in some respects to the chemical properties of photoresist materials commonly used in IC fabrication. Thus, chemical removal of photoresist layers without damaging dielectric layers becomes more difficult.

Several potential low k materials for IC dielectrics are materials that have a high degree of porosity. The open structure of such porous materials includes a significant amount of airspace. Therefore, the overall effective dielectric constant of the material lies between those of air and the fully dense material, typically significantly lower than that of the pure, solid material. Several general classes of porous materials have been described, including porous silicon dioxides.

Previous work by one of the present inventors relates to the use of colloidal silicalite crystals ("CSCs") in forming spin-on dielectric coatings (interlayer dielectrics or "ILDs") in the fabrication of ICs, as described in U.S. application Ser. No. 09/514,966, filed Feb. 29, 2000, incorporated herein by reference. Silicalites are porous crystalline forms of silica having the same crystal structure as zeolites, as described, for example, by Edith Flanigen and Robert Lyle Patton in U.S. Pat. Ser. No. 4,073,865. Colloidal suspensions of silicalite crystals are described, for example, by Jan-Erik Otterstedt and Dale A. Brandreth, *Small Particles Technology* (Plenum Press, 1998), especially Chapter 5. See also *The Synthesis of Discrete Colloidal Crystals of TPA-Silicalite*-1 by A. E. Persson et. al. appearing in *Zeolites*, September/October 1994, pp. 557–567. See also Li, Q., Creaser, D. and Sterte, J., "The Synthesis of Small Colloidal Crystals of TPA-silicalite-1 with Short Synthesis Times and High Yields". in *Porous Materials in Environmentally Friendly Processes*, Ed. I. Kiricsi, G. Pál-Borbély, J. B. Nagy, H. G. Karge, *Stud Surf Sci. Catal.*, 125, 133 (1999), available online as a Master's thesis at http://www.km.luth.se/kmt/theses/qlilic.pdf. CSCs offer the possibility of a porous, low k dielectric material that can easily be deposited on semiconductor wafers with standard wafer processing techniques and that can withstand subsequent etching, polishing and metallization steps.

However, CSCs are not suitable for film or membrane formation by themselves. A suitable binding agent must be used in cooperation with the CSC. That is, a CSC is typically deposited on the surface of a substrate along with a binding agent. Favored binding agents typically contain silicon and oxygen and crosslink at elevated temperatures, binding the CSCs into a porous ILD having adequate mechanical strength to withstand further processing. "Monolithic films" denote the films created by colloidal crystals having been bound together by a binding agent. For integrated circuits, binding agents based on silicon dioxide are desirable because of their proven compatibility with current IC processing steps, such as dielectric reactive ion etching and photoresist removal.

Silicalite crystals of an appropriate size for forming low dielectric constant films for integrated circuits are typically formed by stirring together a silica source, such as TEOS, and a so-called "structure directing agent," or SDA, in water. For many colloidal zeolites and silicalites, the SDA is a quaternary ammonia base. (See, for example, Tsapatsis and Gavalis, *MRS Bulletin*, March 1999, p. 32.) The mixture is stirred at sufficient temperature and for sufficient time for crystals of the desired size to grow. The choice of SDA is the strongest determinant of the crystal structure obtained. For example, tetrapropylammonium hydroxide (a quaternary ammonia base) yields the MFI structure, while tetrabutylammonium hydroxide (another quaternary ammonia base) yields the MEL structure. (Structure nomenclature as used in this application follows International Zeolite Association guidelines.)

To a lesser extent, crystal growth temperature determines the crystal structure obtained. For example, there are some quaternary ammonia species which yield a range of different structures, the predominant structure in a given batch being determined by the growth temperature.

As the crystals form around the SDA's, the large SDA molecules eventually become entrained within the porous crystals. In order for the silicalite crystals to form an advantageous low dielectric constant film, the entrained molecules must be removed. This is because the SDA molecules themselves raise the dielectric constant, and also because they are often polar molecules. Polar molecules tend to attract water, which further increases the dielectric constant. Also, residual basic molecules in the film have the potential to cause unwanted reactions in deep-UV photoresist during subsequent processing. Similarly, to form a useful catalytic membrane or molecular sieve, the channels within the crystals must be cleared of obstructing molecules. The molecules have significantly larger diameter than any single channel in the crystal, in most cases, and so they cannot simply diffuse out. Thus, a need has been identified for a method to break the quaternary ammonia molecules into small, volatile byproducts that can diffuse out of the crystals.

The removal of entrained SDA molecules from zeolite or silicalite crystals may be referred to here as 'detemplating'. Because most industrial uses of zeolites and silicalites do not have severe thermal restrictions, a process referred to as "calcination" has evolved and been described. Calcination consists simply of exposing the crystals to high temperatures (typically 600–800° C.) in the presence of air for up to 24 hours. U.S. Pat. Ser. No. 4,073,865, for example, refers to the calcination of crystals to decompose and burn the organic template. U.S. Pat. Ser. No. 6,177,373 teaches calcination as a means of detemplating thin zeolite films.

However, calcination is not applicable to many emerging applications, including the manufacture of integrated circuits. Integrated circuits contain either aluminum or copper wiring, both of which may deform and/or oxidize severely at temperatures above about 450° C., providing a severe barrier to processing at elevated temperatures. Likewise, crystals suspended in a liquid medium, i.e., a colloidal suspension, will become fused together and unsuited for further processing if the liquid phase is allowed to boil away. Thus, a need for a lower temperature process has been identified.

In summary, for a process to be successful it must meet at least two requirements. First, the process must efficiently convert organic SDA's to small byproducts that can easily diffuse out of the crystals. Second, it must not damage the crystal itself, or the device comprising the crystal.

In addition to ILDs, other applications for monolithic films of silicalite or zeolite nanocrystals include filtration membranes, molecular sieve membranes and catalyzation membranes. See, for example, the work of Anthony Cheethan, Gerald Ferey and Thierry Loiseau in *Angewandte Chemie International Edition*, Vol. 38, pp. 3268–3292 (1999). All of these applications likewise require template removal in order to allow free passage of molecules through the channels of the crystal. Additionally, for some of these applications, a lower-temperature detemplating process would be desirable.

SUMMARY

The present invention relates to the formation of colloidal suspensions of silicalite and zeolite crystals ("CSCs") which, among other applications, can be used in spin-coating of thin films for dielectric layers in integrated circuit ("IC") fabrication. CSCs are typically grown in an alkaline, aqueous medium, and deposited onto the IC, typically by spin-on deposition. However, CSC's as grown contain entrained quaternary ammonia crystals or other structure-directing agents that must be removed to realize many of the advantages the CSCs provide. Thus, the objective of the present invention is to provide methods for removing quaternary ammonias or other structure-directing agents from the CSCs.

This patent describes several ways in which structure-directing agents such as quaternary ammonia molecules are removed by subjecting them to oxidative attack. In general, alkane groups, such as those comprising the ligands of the quaternary ammonia, may be oxidized to form carbon dioxide and water. The decomposition of tetrapropylammonium hydroxide (TPAOH) in the presence of elemental oxygen, for example, can proceed as follows:

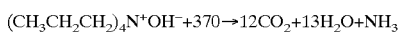

$$(CH_3CH_2CH_2)_4N^+OH^- + 37O \rightarrow 12CO_2 + 13H_2O + NH_3$$

$CO_2$, $H_2O$ and $NH_3$ can all diffuse easily through most zeolite or silicalite crystals. Thus, oxidative attack provides a means of removing the quaternary ammonia molecules from within the silicalite crystals.

This invention describes four methods for achieving detemplating which are compatible with IC manufacturing. Three methods perform the detemplating while the material is still in the colloidal suspension state, while the fourth is performed after the crystals have been bound together to form a film or membrane.

The first method is to use a combination of ammonia, water and hydrogen peroxide at elevated temperature after crystal growth and purification. A second method uses choline, hydrogen peroxide, water and a surfactant. A third method employs ozonated water, which may be used at the same point in the manufacturing process to achieve the same result.

Finally, the colloidal silicalite plus a binder may be applied to a substrate, such as a wafer on which integrated circuits are being formed, and the binder crosslinked to form a mechanically stable thin film. The wafer can then be placed in a chamber designed to create an oxygen-containing plasma above the wafer surface. Some important features of such a chamber are depicted in FIG. 1. Some of the reactive ions in the oxygen-containing plasma strike the porous silicalite-containing film, where they decompose the quaternary ammonia molecules and pump the decomposition products away. It is important to note that this process may also be used to simultaneously initiate crosslirking in the binder, causing it to bind the particles together. Thus, this latter method may simultaneously cure the film while it is detemplating the crystals.

There may be economic benefits to using the approaches described in this application, as compared with calcining, even if the structure in question is able to withstand high temperatures.

DETAILED DESCRIPTION

For economy of language, the term "silicalite" will be used herein to describe both true silicalites and also zeolites that may be processed by the methods described herein, typically high-silica zeolites. Examples include the recognized crystalline forms conventionally abbreviated as follows: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CFI, CGF, CGS, CHA, -CHI, -CLO, CON, CZP, DAC, DDR, DFO, DFT, DOH, DON, EAB, EDI, EMT, EPI, ERI, ESV, EUO, FAU, FER, FRA, GIS, GME, GON, :GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, OSO, -PAR, PAU, PHI, RHO, -RON, RSN, RTE, RTH, RUT, SAO, SAS, SAT, SAV, SBE, SBS, SBT, SFE, SFF, SGT, SOD, STF, STI, STT, TER, THO, TON, TSC, VET, VFI, VNI, VSV, WEI, -WEN, YUG or ZON. The detailed structures for these zeolites are given in conventional references, including the *Atlas of Crystal Structure* published by the International Zeolite Association, www.iza-online.org.

Figure 2:
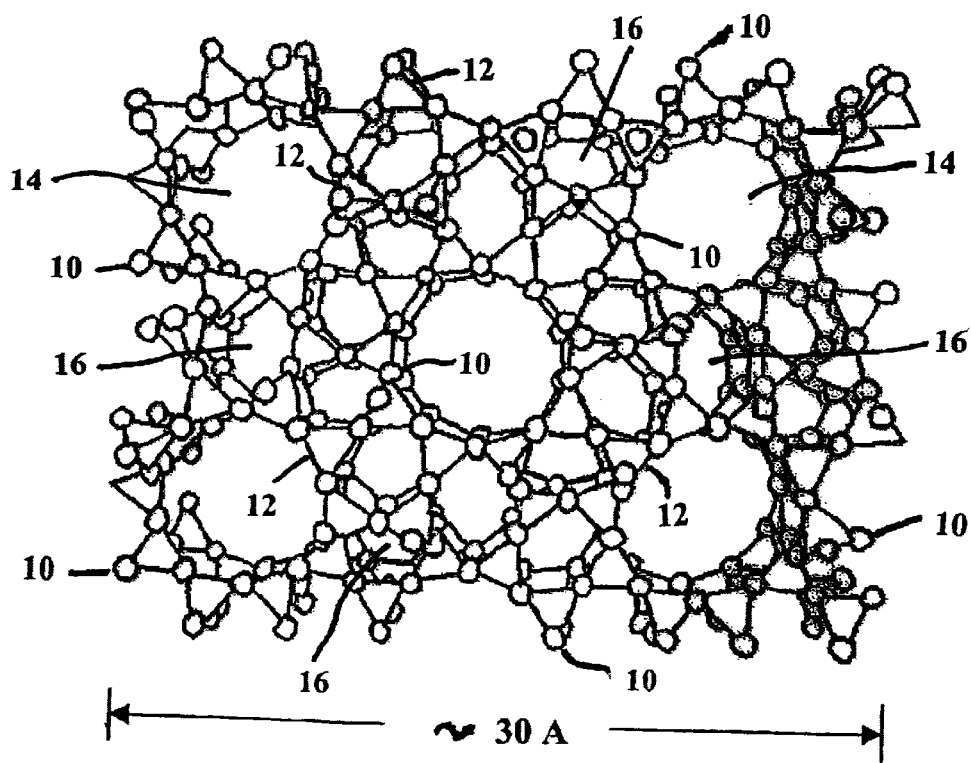
FIG. 2 shows the structure of an MFI silicalite crystal.

As one particular example intended to be illustrative and not limiting, processing conditions and materials are presented for the detemplating of zeolite or silicalite "MFI". The structure of MFI is given at the above-referenced website and reproduced herein in FIG. 2. The balls 10 represent oxygen atoms and the center of each tetrahedron 12 represents the location of a silicon atom. The large channels 14 are 10 Å in diameter; the small channels 16 are 4–6 Å in diameter. MFI is considered by way of example and not limitation as it is anticipated that similar procedures will be applicable to other zeolites as described and listed herein.

"Colloidal silicalite crystal" or "CSC" as used herein includes colloidal suspensions of both true silicalites as well as other zeolite crystals, wherein the suspension contains discrete crystals which are sufficiently small to remain in colloidal suspension essentially indefinitely, typically crystals in the size range from about 80 Angstroms to about 5000 Angstroms in diameter (1 Angstrom=$10^{-8}$ cm). Typically, zeolites containing a high fraction of silica (typically greater than about 80% of the T sites occupied by silicon atoms, or a 4:1:10 ratio of Si:X:O, where X is Al or another metal), will be amenable to detemplating by the procedures described herein. It is anticipated that the present invention will find its initial application in the creation of ILDs using true silicalite crystals, and this case is discussed in greatest detail. However, applications of the present invention to other zeolite applications will be obvious to those having ordinary skill in the art and are included within the scope of the present invention.

Figure 1:
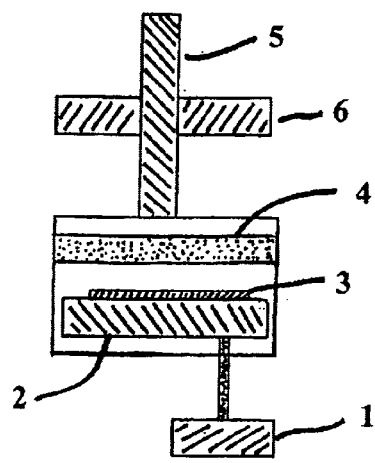
FIG. 1 shows schematically the important features of a typical "ash" chamber that can be used in a plasma process in accordance with the invention.

FIG. 1 shows schematically the important features of a typical "ash" chamber. Included are an RF plasma generator 1, a platen 2 with temperature control, a "showerhead" 3 for introducing gases into the chamber, a plasma gas inlet 5, and a microwave plasma generator 6. A wafer that is to be processed is numbered 3. An ash chamber that is satisfactory for processing a thin film comprising silicalite or zeolite crystals as described herein is the Iridia™ or Sierra™ ash chamber, available from Novellus Systems, Inc., of San Jose, Calif.

The present invention relates to previous work described in U.S. application Ser. No. 09/514,966 commonly assigned herewith and incorporated herein by reference (the "'966" application"). The '966 application relates to the use of colloidal silicalite crystals ("CSCs") as a dielectric material for use in connection with the fabrication of integrated circuits ("ICs"). CSCs are typically grown in an alkaline, aqueous medium, and deposited onto the IC, typically by spin-on deposition. The colloidal suspension also comprises a binder, examples being tetraethoxysilane ("TEOS") and its partially hydrolyzed derivatives, tetramethoxysilane ("TMOS") and its partially hydrolyzed derivatives, compounds derived from the family of silsesquioxanes including methylsilsequioxane ("MSQ"), hydridosilsesquioxane ("HSQ") and the polyoctahedralsilsesquioxanes ("POSSs"), among others. One characteristic by which binding agents differ from CSCs is that the binding agents typically comprise single molecules or, at most, an oligomer of not more than a few repeat units. This is in contrast to the CSCs which may contain hundreds or thousands of unit cells. Although there is not a precise distinction between a solution and a suspension, the binding agents may generally be described as in solution while the CSCs are large enough entities to warrant description as a colloidal suspension.

There is a need for a low-temperature method of removing quaternary ammonia molecules from inside silicalite or zeolite crystals. The present invention includes methods for oxidatively attacking the quaternary ammonias, yielding volatile compounds including carbon dioxide, water and ammonia. The primary purposes of performing this detemplating are to reduce the dielectric constant of the crystals, and also to prevent unwanted contamination of DUV photoresist by basic compounds, e.g., ammonia. The methods of oxidative attack disclosed here are exposure to ammonia, water and hydrogen peroxide; exposure to water, choline, hydrogen peroxide and a surfactant; exposure to aqueous ozone and exposure to oxygen-containing plasma.

When the intended application is integrated circuit manufacture, it is desirable to remove the quaternary ammonia templates before the crystals are deposited on the IC substrate. This is because each processing step in IC manufacture carries a finite risk of damaging or destroying the integrated circuits being manufactured. Thus, the less processing and handling required on the actual IC, the higher, generally, will be the number of saleable chips produced. It should be clear, then, that performing the detemplating step ex-situ from the IC substrate is preferred to performing this step once the film has been applied to the substrate.

When the intended application is formation of catalytic membranes or molecular sieves, it may prove economically advantageous to perform detemplating as described in this invention rather than traditional thermal methods. Also, by performing the detemplating before the crystals are cast into thin film form, the range of materials available for binders is expanded. This is because the requirement that the binders can withstand the high temperatures required for successful calcination is removed.

We describe herein specific procedures found to be convenient for quaternary ammonia detemplating pursuant to the present invention. Modifications of the specific procedures described herein for use with other SDAs will be apparent to those skilled in the art and included within the scope of the present invention.

EXAMPLE 1

Oxygen-containing Plasma

Detemplating is not a requirement for the successful deposition of thin films of silicalite crystals plus binder, though it is a requirement for subsequent use as a component of an integrated circuit. Thus, it is conceivable that a film comprising silicalite crystals with SDA molecules still entrained within could be deposited on the surface of an integrated circuit wafer. The fourth method of detemplating disclosed in this invention occurs at this point in the manufacture of the integrated circuit.

In this example, two wafers were manufactured according to the '966 application, with no attempt to remove the quaternary ammonia molecules during crystal growth, solvent exchange, binder addition or film deposition. A film or membrane ~1.2 microns thick was deposited and subsequently heated to about 200° C. for three minutes. This latter step was employed to drive off any remaining solvent, which is rich in carbon and which could therefore skew the interpretation of residual carbon in the films. After this step, it is assumed that nearly all the carbon remaining in the film is in the form of tetrapropylammonium hydroxide entrained within the crystals.

Once thin films comprising silicalite and binder were formed, one of the two wafers was subjected to an oxygen-containing plasma at a pressure of approximately 100 mTorr and a temperature of 250° C., using an Iridia m ash tool from Novellus Systems, Inc. An oxygen plasma was generated with an upstream microwave generator. The wafer was exposed to the plasma for about 120 seconds. Alternatively, a radio-frequency (RF) generator could be used, and instead of using an upstream plasma the thin film could be placed within the plasma. The thin film or membrane may be held at a temperature between room temperature and 300° C. while exposing the film or membrane to the plasma.

The concentrations of nitrogen and carbon in the films (which we assume is nearly all in the form of tetrapropylammonium hydroxide) were then measured with Secondary Ion Mass Spectroscopy, or SIMS. In this technique, an ion beam is directed against the top surface of the film under study, ionizing and ablating all the material, which is then measured, atom by atom, with a mass spectrometer. As the beam continues to hit the top of the sample, it drills a hole through the sample to the substrate beneath. Thus, what is gained from the analysis is a profile of atomic concentrations as a function of position within the film.

Figure 3:
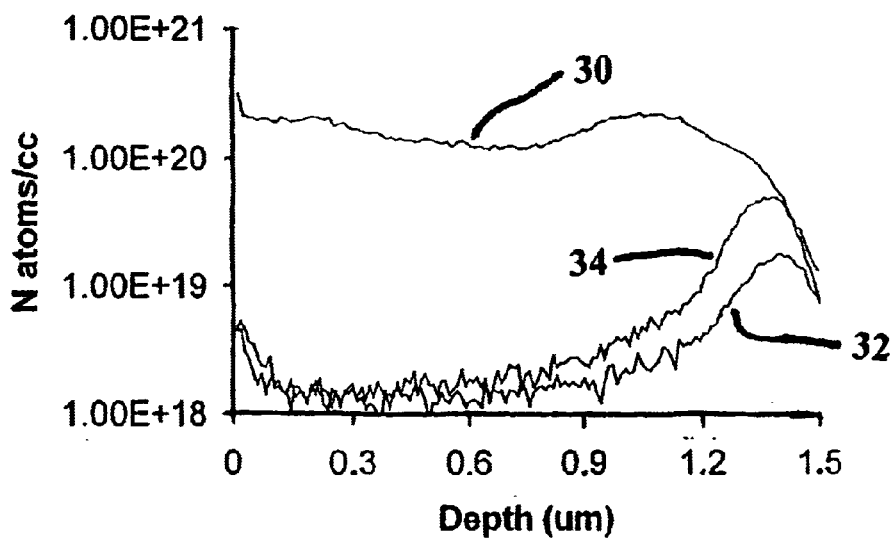
FIG. 3 is a graph showing the level of nitrogen measured in silicalite films before and after ash treatment.

FIG. 3 is a graph showing the concentration of nitrogen (atoms/cc) in the film for three otherwise-identical samples: profile 30 is for a film which received no detemplating, profile 32 is for a film which was calcined at 530° C. in air for at least eight hours, and is provided as a reference for the traditional method of detemplating, and profile 34 is for the sample that was exposed to an oxygen-containing plasma, as described above, for two minutes. Nitrogen is present in the film in the form of tetrapropylammonium hydroxide. The left edge of the graph represents the top surface of the sample, and the sudden changes in all three signals at a depth of ~1.2 microns represent the silicalite/substrate interface. Each sample shows an essentially unvarying profile throughout the film, with a change in concentration beginning at the film/substrate interface. The graph shows that ashing (i.e., treating in an oxygen-containing plasma) for two minutes is as effective at removing tetrapropylammonium hydroxide as heating overnight in air at 530° C.

Figure 4:
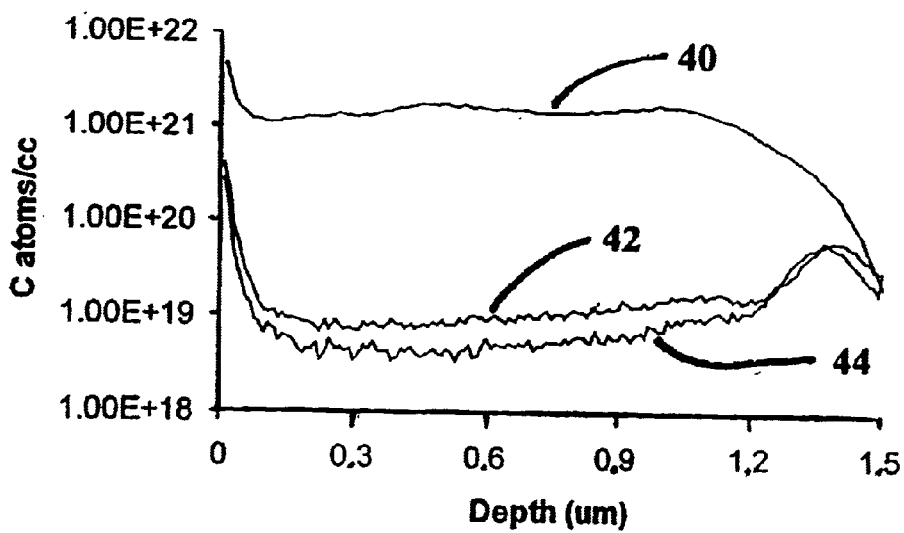
FIG. 4 is a graph showing the level of carbon measured in silicalite films before and after ash treatment.

FIG. 4 is a graph of the concentration of carbon in the film that confirms the results suggested by FIG. 3. The left edge of the graph represents the top surface of the sample, and the sudden changes in all three signals at a depth of ~1.2 microns represent the silicalite/substrate interface. Carbon is present in the film in the form of tetrapropyl ammonium hydroxide. Profile 40 is for the film which received no detemplating, profile 42 is for the film which was calcined at 530° C. in air for at least eight hours, and profile 44 is for the sample that was exposed to an oxygen-containing plasma, as described above, for two minutes. First, the level of carbon in the untreated film is about an order of magnitude higher than the level of nitrogen, which is consistent with the twelve-to-one carbon-to-nitrogen ratio in tetrapropyl ammonium hydroxide. The graph shows that ashing (i.e., treating in an oxygen-containing plasma) is as effective at removing tetrapropyl ammonium hydroxide as heating overnight in air at 530° C.

Thus, we conclude that exposure to oxygen plasma after casting into thin film form is a fast, cheap and relatively low-temperature method of detemplating silicalite and zeolite molecules.

EXAMPLE 2

Aqueous Ammonia/Peroxide

For the fabrication of colloidal silicalites, we have closely followed the procedures first outlined by Otterstedt et. al. in U.S. Pat. Ser. No. 5,863,516, while employing crystal growth procedures outlined by Li.

A mixture of tetrapropylammonium hydroxide (TPAOH) :TEOS:water in a molar ratio of 9:25:480 was mixed in a plastic vessel for 24 hours. A 500 ml polyallomer vessel with a screw cap was cleaned, 114 ml of TPAOH was added to it, then 146 ml water, and finally 140 ml TEOS was added dropwise while stirring. The bottle was sealed and placed on an orbital shaker, where it was shaken for twenty-four hours. It was then immersed in a 45° C. circulating oil bath for 16 days, and finally immersed in an 80° C. bath for 18 hours. After this treatment, the solution was seen to be slightly whitish, and contained silicalite particles in the size range 200–500 Å, with a median of about 380–400 Å. Purification was then carried out by centrifugation and redispersion in deionized water.

The concentration of silicalite particles was greatly increased by redispersing in a smaller volume of liquid than originally mixed, i.e. redispersing the original 400 ml of reactants into 140 ml of deionized water. Optionally, purification could include exposing the colloidal suspension to an ion exchange resin.

After purification and concentration, the colloidal suspension had a pH of about 8.5–9. Nearly all of the non-entrained TPAOH was removed from solution. At this point, the volume of the suspension was about 140 ml. 70 ml was then set aside to be used as a reference material, and will be referred to as Solution A. To the remaining 70 ml was added 230 ml of a mixture of 30% hydrogen peroxide in water and 100 ml of a 50% v/v ammonium hydroxide solution in water. Thus, the final volumes of each component were approximately 350 ml water, 50 ml hydrogen peroxide and 50 ml ammonium hydroxide. The pH of this solution was about 14. The ratio of water to ammonium hydroxide to hydrogen peroxide in the mixture could be in the range of about 5:1:1 to about 7:2:1. This solution was allowed to sit for one hour at room temperature, during which time oxidative attack on the entrained TPAOH molecules occurred. Alternatively, the temperature could have been between room temperature and about 50° C. The solution was then subjected to a second round of purification by centrifugation and redispersion in deionized water. This will be referred to as Solution B.

Subsequent processing to form a stable alcohol-based silicalite colloidal suspension has been described in the '966 application. Both Solution A and Solution B were subjected to this procedure, yielding, for Solution A, a stable alcohol-based silicalite colloidal suspension with no attack on the entrained SDA molecules, and for Solution B, a stable alcohol-based silicalite colloidal suspension in which the entrained SDA molecules had undergone oxidative attack.

Figure 5:
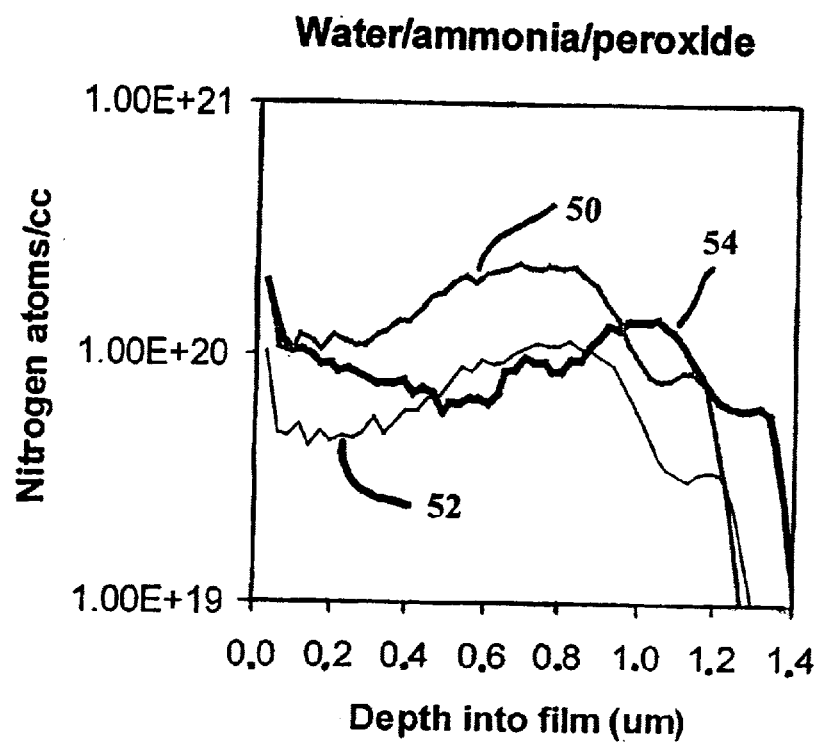
FIG. 5 is a graph showing the level of nitrogen measured in silicalite films formed with and without ammonia/peroxide/water treatment.

FIG. 5 is a graph showing the concentration of nitrogen (atoms/cc) in the film for three otherwise-identical samples: profile 50 is from a film cast from Solution A, profile 52 is from a film which was cast from Solution A and then calcined at 530° C. in air for at least eight hours, and is provided as a reference for the traditional method of detemplating, and profile 54 is from a film cast from Solution B. Nitrogen is present in the film in the form of tetrapropylammonium hydroxide. The left edge of the graph represents the top surface of the sample, and the sudden changes in all three signals at a depth of 1 microns represent the silicalite/substrate interface. Each sample shows an essentially unvarying profile throughout the film, with a change in concentration beginning at the film/substrate interface. The graph shows that the water/ammonia/peroxide treatment described above is as effective at removing tetra-propylanuonium hydroxide as heating overnight in air at 530° C.

Figure 6:
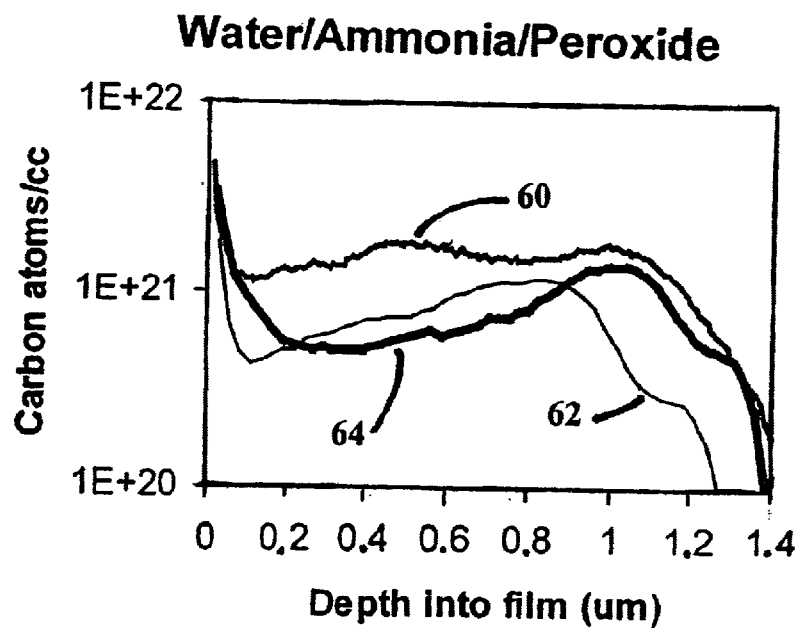
FIG. 6 is a graph showing the level of carbon measured in silicalite films formed with and without ammonia/peroxide/water treatment.

FIG. 6 is a graph of the concentration of carbon in the film that confirms the results suggested by FIG. 5. The left edge of the graph represents the top surface of the sample, and the sudden changes in all three signals at a depth of ~1 microns represent the silicalite/substrate interface. Carbon is present in the film in the form of tetrapropyl ammonium hydroxide. Profile 60 is from a film cast from Solution A, profile 62 is from a film cast from Solution A and then calcined at 530° C. in air for at least eight hours, and profile 64 is from a film cast from Solution B. First, the level of carbon in the untreated film is about an order of magnitude higher than the level of nitrogen, which is consistent with the twelve-to-one carbon-to-nitrogen ratio in tetrapropyl ammonium hydroxide. The graph shows that the water/ammonia/peroxide treatment described above is as effective at removing tetra-propylammonium hydroxide as heating overnight in air at 530° C.

Thus, we conclude that exposure to oxygen plasma after casting into thin film form is a fast, cheap and relatively low-temperature method of detemplating silicalite and zeolite molecules.

The results of the processes which use choline are not expected to differ substantially from the ammonia/peroxide case. In other words, the water/choline/peroxide/surfactant mixture is introduced to the zeolite or silicalite crystals at the same point in the processing sequence, and the processing times and temperatures are expected to be in the same range as is used for ammonia/hydrogen peroxide detemplating. The ratio of water to choline base to hydrogen peroxide to surfactant could be in the range from about 195:3:1:1 to 45:3:1:1 and after the addition of choline base, hydrogen peroxide, and surfactant, the colloidal suspension could be maintained at a temperature of between 45° C. and 55° C. A purification process may be performed for removing the choline base, hydrogen peroxide, surfactant and reaction byproducts from the colloidal suspension, leaving a colloidal suspension comprising substantially only water, silicalite crystals, and sufficient base to maintain colloidal stability. The purification process may comprises centrifuging the colloidal suspension, decanting the liquid phase, and redispersing the solid phase in deionized water and optionally exposing the colloidal suspension to an ion exchange resin.

Likewise, the results of the processes which use aqueous ozone are not expected to differ substantially from the ammonia/peroxide case. In other words, the ozone is introduced to the zeolite or silicalite crystals at the same point in the processing sequence, and the processing times and temperatures are expected to be in the same range as is used for ammonia/hydrogen peroxide detemplating. The colloidal suspension of silicalite or zeolite crystals in an aqueous suspension can be transferred into an apparatus for generating aqueous ozone, thereby creating ozone within the colloidal silicalite suspension. The amount of ozone created in the suspension may be in the range 10–100 parts per million and the colloidal silicalite suspension may be maintained at a temperature between 0° C. and room temperature while the ozone is being created.

The embodiments described herein are illustrative only, and not limiting. Numerous additional and alternative embodiments within the broad scope of this invention will be apparent to persons of skill in the art.

We claim:

1. A method of removing a quaternary ammonia molecule from a colloidal suspension of silicalite or zeolite crystals in an aqueous suspension comprising:
    adding a mixture of water, ammonium hydroxide and hydrogen peroxide to said aqueous suspension, producing thereby a strongly oxidizing environment.

2. The method of claim 1, wherein the ratio of water to ammonium hydroxide to hydrogen peroxide in the mixture is in the range of about 5:1:1 to about 7:2:1.

3. The method of claim 1, comprising maintaining the colloidal suspension to which ammonium hydroxide and hydrogen peroxide have been added at temperatures between room temperature and about 50° C.

4. The method of claim 1, further comprising a purification process for removing the ammonium hydroxide, hydrogen peroxide and reaction byproducts from the colloidal suspension, leaving a colloidal suspension comprising substantially only water, silicalite crystals, and sufficient base to maintain colloidal stability.

5. The method of claim 4, wherein the purification process comprises centrifuging the colloidal suspension, decanting the liquid phase, and redispersing the solid phase in deionized water.

6. The method of claim 4, wherein the purification process comprises exposing the colloidal suspension to an ion exchange resin.

7. A method of removing a quaternary ammonia molecule from a colloidal suspension of silicalite or zeolite crystals in an aqueous suspension comprising:
    adding a mixture of choline base, hydrogen peroxide and surfactant to said aqueous suspension, producing thereby a strongly oxidizing environment.

8. The method of claim 7, wherein the ratio of water to choline base to hydrogen peroxide to surfactant is in the range of about 195:3:1:1 to 45:3:1:1.

9. The method of claim 7, comprising maintaining the colloidal suspension to which choline base, hydrogen peroxide and surfactant have been added at a temperature between 45° C. and 55° C.

10. The method of claim 7, further comprising a purification process for removing the choline base, hydrogen peroxide, surfactant and reaction byproducts from the colloidal suspension, leaving a colloidal suspension comprising substantially only water, silicalite crystals, and sufficient base to maintain colloidal stability.

11. The method of claim 10, wherein the purification process comprises centrifuging the colloidal suspension, decanting the liquid phase, and redispersing the solid phase in deionized water.

12. The method of claim 10, wherein the purification process comprises exposing the colloidal suspension to an ion exchange resin.

13. A method of removing a quaternary ammonia molecule from a colloidal solution of silicalite or zeolite crystals in an aqueous suspension comprising:

adding a mixture of ozone and water to the colloidal solution.

14. The method of claim 13, wherein the mixture contains ozone in the range 10–100 parts per million of water.

15. The method of claim 14, comprising holding the temperature of the solution between 0° C. and room temperature.

16. The method of claim 14, wherein the ratio of colloidal silicalite to water/ozone in the mixture is between 1:2 and 2:1.

17. A method of removing a quaternary ammonia molecule from a colloidal suspension of silicalite or zeolite crystals in an aqueous suspension comprising:

transferring the colloidal suspension into an apparatus for generating aqueous ozone, and creating ozone within the colloidal silicalite suspension.

18. The method of claim 17, wherein the amount of ozone created in the suspension is in the range 10–100 parts per million.

19. The method of claim 17, comprising holding the colloidal silicalite suspension at a temperature between 0° C. and room temperature while the ozone is being created.

20. A method of removing a quaternary ammonia molecule from a thin film or membrane comprising silicalite or zeolite crystals comprising exposing the film or membrane to an oxygen-containing plasma.

21. The method of claim 20, comprising generating the oxygen-containing plasma with an RF generator.

22. The method of claim 20, comprising generating the oxygen-containing plasma with a microwave generator.

23. The method of claim 20 comprising placing the thin film or membrane within the plasma.

24. The method of claim 20 comprising placing the thin film or membrane downstream of the plasma.

25. The method of claim 20 comprising holding the film or membrane at a temperature between room temperature and 300° C. while exposing the film or membrane to the plasma.

* * * * *